Aug. 10, 1943.　　E. W. HEETER ET AL　　2,326,641
BOTTLE STOPPER AND SIPHON
Filed Nov. 15, 1940

INVENTORS.
Edward W. Heeter
AND
Robert C. Woodhead
By Spencer, Marzall, Johnston & Cook, Att'ys.

Patented Aug. 10, 1943

2,326,641

UNITED STATES PATENT OFFICE 2,326,641

BOTTLE STOPPER AND SIPHON

Edward W. Heeter, Belvidere, Ill., and Robert C. Woodhead, Elizabeth, N. J., assignors to Central Rubber & Mfg. Co., Chicago, Ill., a corporation of Illinois Application November 15, 1940, Serial No. 365,820

3 Claims. (Cl. 215—4)

This invention relates to a bottle stopper and particularly to a stopper made of soft, flexible, rubber-like material, whereby to seal a bottle. More specifically, the invention relates to a flexible, rubber-like bottle stopper which is adapted to be applied over the neck of bottles which have been previously opened to preserve the contents of the bottle.

An important object of the present invention is the provision of a new and improved bottle stopper made of soft, flexible, rubber-like material having a neck portion which is adapted to be inserted within the bottle neck and an overlapping portion engageable with a bead around the bottle neck so as to make an airtight connection with the bottle, the stopper having an opening therethrough and a new and improved valve mechanism, whereby the stopper may also be used as a siphon for bottled carbonated beverages.

Another important object of the invention is to provide a rubber-like stopper for stopping the neck of a bottle, there being communicating passages formed in the stopper and adapted to have operative communication by depressing an integral part of the stopper body.

A still further object of the invention is the provision of a new and improved stopper element having incorporated therewith means whereby the stopper not only acts as means for sealing or corking a bottle, but also to provide siphon means to drain the carbonated liquid contents in the bottle.

A further object of the invention is the provision of a rubber stopper element, being provided with passages therein whereby the stopper may be used as a siphon, the stopper also being provided with means whereby air may be incorporated interiorly of the bottle to cause the carbon dioxide or other carbonated means from becoming disassociated with the liquid in the bottle, as well as to cause a pressure in the bottle to insure definitely continued siphonic action.

Numerous other objects and advantages will be apparent throughout the progress of the following specification.

The accompanying drawing illustrates selected embodiments of the invention, and the views therein are as follows.

Figure 1:
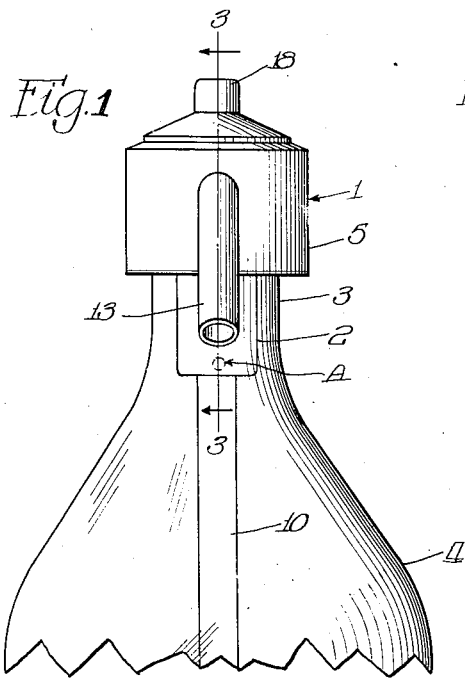
Figure 1 is a detail elevational view of a bottle with which the improved stopper constituting the invention is applied.
Figure 2:
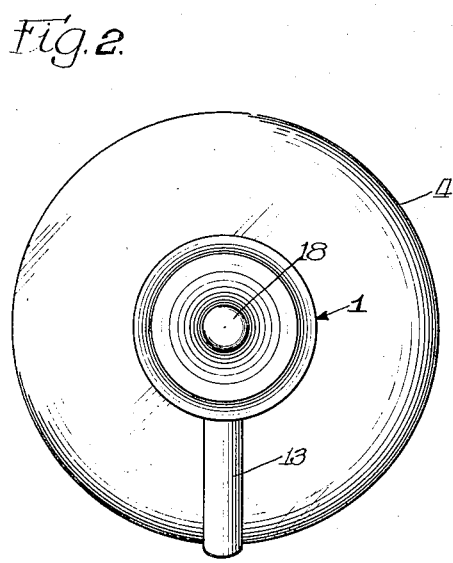
Figure 2 is a detail top plan view.

The invention is adaptable particularly for use with bottles containing carbonated liquids such as sparkling water, gingerale and the like. The stopper is preferably made of rubber and comprises a body portion 1 having a stem 2 which is adapted to extend downwardly inside the neck 3 of a bottle 4. The body 1 also includes a downwardly extending integral portion 5 which extends exteriorly of the bottle neck and has an annular groove 6 adapted to receive the bead 7 about the upper external end of the bottle neck.

The stem 2 is provided with a vertical passage 8 which communicates with a chamber 9 formed interiorly of the rubber body 1 and is adapted to receive a tube 10 which extends downwardly inside of the bottle substantially to the bottom thereof. The body 1 is also provided with a passage 11 through a side thereof which communicates with a chamber 12 formed in the rubber body upwardly of the chamber 9 and near the upper part of the body 1. The passage 11 is adapted to receive a curved spout 13 through which the carbonated liquid in the bottle flows during operation of the device.

The upper end of the chamber 9 is provided with a valve seat 14 against which a valve member 15 seats. The valve member 15 is in the form of a screw, the head of the screw comprising the valve 15. The stem 16 of the screw passes through a passage 17 which connects the chamber 12 with the chamber 9. The extreme threaded end of the screw member threadedly engages a nipple or extension 18 at the extreme upper end of the body. A complete passage is formed from the interior of the bottle through the spout 13 by means of the passage 8 carrying the tube 10, the compartments 9 and 12 connected by the passage 17 and the passage 11 into which the spout 13 is arranged. Carbonated fluid in the bottle, therefore, is free to pass through the above-mentioned chambers and passages and out of the spout 13 when the valve 15 is removed from the seat. The chamber 12 forms a relatively thin connecting wall 19 between the nipple 18 and the chamber 12, whereby the nipple 18 is normally maintained in normal position as shown in Figure 1 but, because of the resiliency of the material, is adapted to be pressed downwardly so as to remove the valve 15 from its seat 14.

After a bottle of carbonated beverage, such as sparkling water, ginger ale, etc., is opened, the combined stopper and siphon is arranged in place, whereby the bottom of the tube 19 will extend substantially at the extreme bottom of the bottle, and the stopper, by pressing the rubber body, is applied about the neck of the bottle, as shown. In placing the combined stopper and siphon in position, it is desirable and advantageous that the nipple be pressed downwardly to unseat the valve so that the fluid will be free to extend up into the tube 10. In order to prevent agitation or so-called "boiling" when the tube is pushed down into the liquid, the valve should be unseated, or other means provided to permit the escape of air from the tube. This latter means may comprise an opening or aperture A formed in the tube near the upper end thereof and below the end of the stem when the tube 10 and body 1 are arranged in inoperative position. The tube thus is made of sufficient length so that the extreme bottom of the tube may extend to the bottom of the bottle so that when the stopper is pushed down into sealing engagement with the bottle, the tube will be pressed upwardly in the stem, whereby the orifice or aperture A will be covered by a part of the stem 2, as clearly shown in Figures 3 to 5. In order to permit fluid to pass through the tube, the bottom of the tube 10 is cut at an angle of about 45°. In applying the device to the bottle, the tube is so positioned with respect to the stem 2 of the body member that the opening A will be below the bottom edge of the stem 2. Then as the stopper is pressed down into sealing engagement with the neck of the bottle, the bottom beveled edge of the tube will strike the bottom of the bottle and cause the tube to be forced upwardly into operative position with respect to the neck 3. This construction permits air in the tube to be dissipated as the device is being applied to the bottle neck. After the stopper is applied in position, the bottle is shaken whereby to give life to the gas. Then as the nipple or button 18 is pressed downwardly, the passage through the tube 10 and through the spout 13 will be completely opened and the carbonated water, because of its gaseous content, will flow through the spout 13. In such cases where there is sufficient gas in the liquid to force all the liquid out of the bottle, the contents may be again shaken to create additional gaseous pressure. Moreover, the device provides a siphon for bottles completely sealing the bottle when not in use and providing a siphon at all times.

Figure 3:
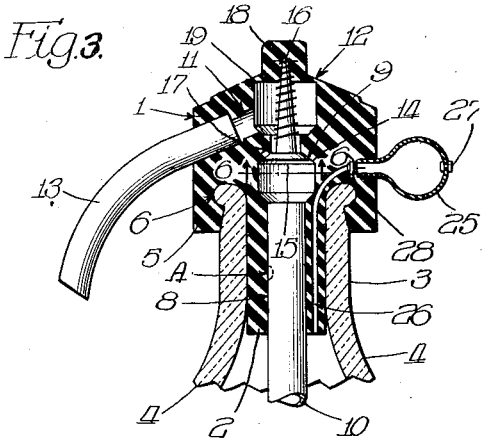
Figure 3 is a detail longitudinal sectional view on the line 3—3 of Figure 1.
Figure 5:
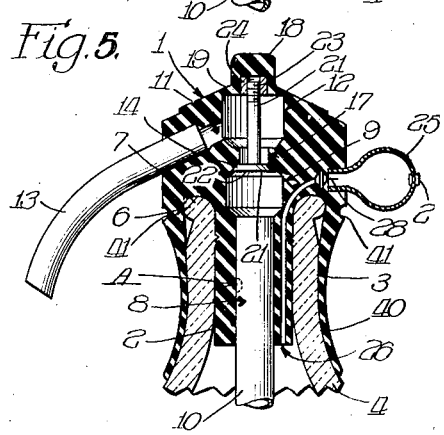
Figure 5 is a view similar to Figures 3 and 4 but shows another modified form of means for securing the stopper in position about the neck of the bottle.
Figure 6:
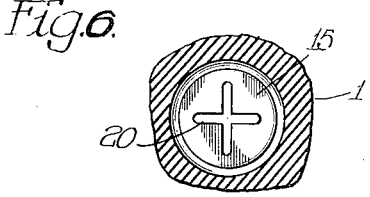
Figure 6 is a detail sectional view on the line 6—6 of Figure 3.

The valve 15 is in the form of a screw, as shown in Figure 3, and is applied by forcing the screw through the passage 8 until the underside of its head engages the valve seat 14. By means of a screw driver, the valve may be turned so that several threads of the screw are in engagement with the rubber, whereby the valve is properly seated and properly supported. The head of the screw comprising the valve 15 is preferably as indicated in Figure 6, whereby a cross slot 20 is formed to receive the bit of a screw-driver. The ends of the cross slots do not extend to the outer periphery of the screw head, and therefore a solid valve member is provided which seats snugly against the valve seat. If, however, the slots extended completely to the extreme edge of the screw head, there would be a possibility of leakage about the valve seat. However, by the use of a particular kind of screw to provide the valve member 15, very satisfactory results have been obtained, and a tight seal is provided between the seat and the valve head 15. Instead of using the particular type of screw to form the valve 15, as shown in Figures 3 and 6, a valve member 21, Figures 4 and 5, may be employed. The valve member 21 has a head 22 which forms the valve for engagement with the valve seat 14. The end of the valve may be threaded, as indicated at 23, so as to threadedly engage a nipple member 24 imbedded in the button part 18 of the rubber body 1.

It is well known that a partly empty bottle of carbonated liquid, even though tightly sealed, will lose its effervescence after it has stood for awhile. This occurs because the carbon dioxide or other gas leaves the liquid and floats to the top of the bottle above the liquid line. Therefore, while there may be sufficient gas pressure in the bottle to force the liquid out of the bottle when the valve 15 is open, there is an insufficient quantity of gas in the liquid to make it palatable. Means are therefore provided to insure sufficient pressure within the partly empty bottle so that even after it has stood for a considerable length of time, the liquid, with its proper carbonation, may be forced through the spout 13. The means for performing this function may consist of any means for supplying air pressure inside of the bottle but at the top thereof. The addition of air pressure will cause the carbon dioxide, or other gas, to be forced back into the liquid and, at the same time, create sufficient pressure above the liquid to force the liquid through the spout when the valve is opened. The specific means herein disclosed for effecting this operation comprises a small bulb 25 preferably mounted at the side of the body 1 and having communication with a small tubular passage 26 formed in the body 1. A valve 27 is formed in the bulb 25 so that air may be forced interiorly of the bulb but prevented from passing out of the bulb. Moreover, the bulb includes a second valve 28 at its inner end to prevent any pressure inside of the bottle from passing through the passage 26 and into the bulb. Therefore, by merely pressing the small bulb 25 a few times, in the same manner in which an atomizer bulb is operated, air pressure is formed inside of the bottle. This air pressure will provide the sufficient force required to force the liquid contents in the bottle out through the spout 13 without in any way affecting the gas content of the liquid. Moreover, it has been found that the left over contents in the bottle, after it has stood for awhile, will retain all the effervescent characteristics of the contents as when originally opened, if the bulb is operated a few times before the valve 15 is operated. Operation of the bulb supplies pressure inside of the bottle and tends to force the carbon dioxide or other gas into the fluid and at the same time supplies sufficient pressure to force the liquid contents out of the bottle and through the spout 13.

The invention can be readily and economically manufactured. It is also efficient in that it seals the bottle neck tightly and prevents the escape of any of the gas contained in the liquid. Moreover, the device can be readily molded and comprises few and simple parts.

Figure 4:
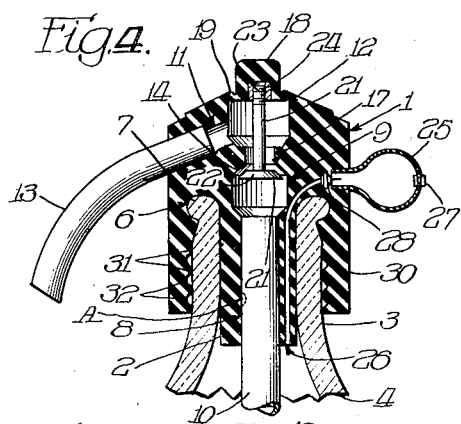
Figure 4 is a view similar to Figure 3 but shows a modified form of means for securing the stopper to the bottle neck.

In Figure 4, the rubber body 1 is provided with an extended apron 30 having a plurality of spaced annular ribs and grooves 31 and 32 to engage the outer surface of the bottle neck. In Figure 5, the body 1 is provided with a flexible apron portion 40 which may have a weakened line of resistance at the point indicated at 41, whereby a tight seal is effected between the bottle neck and the body 1. In the latter embodiment, the apron 40, when not in use, may be stretched and turned upwardly and then pulled downwardly alongside of the bottle neck, as shown in Figure 5.

Regardless of the type of means for effecting a tight stopper or cork for the bottle, the invention contemplates a flexible, rubber-like body having means for making a tight liquid-proof seal between the bottle neck and the stopper, whereby the gaseous contents of the bottle is prevented from escaping. Moreover, the invention provides a means which is unique because of its simplicity and construction of parts, whereby a relatively inexpensive stopper may act as a siphon. The stopper also includes means for forcing air pressure inside of the bottle. In this latter embodiment, it has been deemed advisable to provide the passage 26, as shown, instead of having a direct passage from the bulb 25 to the compartment 9, whereby air would be forced through the tube. Such an arrangement would cause a disturbance of the liquid and drive the gas out of the liquid instead of driving the gas into the liquid.

The invention is relatively simple in construction, can be readily and economically manufactured and may be applied instantly and quickly to the necks of bottles.

Changes may be made in the form, construction and arrangement of the parts without departing from the spirit of the invention or sacrificing any of its advantages, and the right is hereby reserved to make all such changes as fairly fall within the scope of the following claims.

The invention is hereby claimed as follows:

1. A combined bottle stopper and siphon comprising a body member made of flexible, rubber-like material and having a downwardly extending stem portion adapted to extend into the neck of a bottle to provide a seal for the bottle, an exteriorly depending portion adapted to engage the outside of the bottle to further seal the bottle, said body having a chamber therein and a pair of passages in communication with the chamber, one of said passages extending longitudinally of the stem, a valve in the chamber between said passages to close communication therebetween, said valve being operated to effect communication between passages by depressing a part of said body member, a tube slidably mounted in the passage in the stem and adapted to extend downwardly into a bottle near the bottom of the bottle, said tube being provided with an opening for passages of gas and air in an upper side wall thereof, and said opening being positioned to be opened and closed by said stem upon sliding movement of said tube within the stem.

2. A combined bottle stopper and siphon comprising a body member made of flexible, rubber-like material and having a downwardly extending stem portion adapted to extend into the neck of a bottle to provide a seal for the bottle, an exteriorly depending portion adapted to engage the outside of the bottle to further seal the bottle, said body having a chamber therein and a pair of passages in communication with the chamber, one of said passages extending longitudinally of the stem, a valve in the chamber between said passages to close communication therebetween, said valve being operated to effect communication between passages by depressing a part of said body member, a tube in the passage in the stem and adapted to extend downwardly into a bottle into engagement with the bottom of the bottle, said tube being provided with an opening for passage of gas and air in an upper side wall thereof, said opening being adapted to be positioned below said stem during insertion of said stopper, and said tube having a length such that said opening is moved upwardly to be closed by said stem upon complete insertion of the stopper.

3. A combined bottle stopper and siphon comprising a body member having a downwardly extending stem portion adapted to extend into the neck of a bottle, means for securing said body member to the neck of a bottle to seal the bottle, said body member having a pair of communicating passages, one of said passages extending longitudinally of said stem, a valve for closing communication between said passages, means on said body member for operating said valve to effect communication between the passages, a tube slidably mounted in the passage in said stem and adapted to extend downwardly into a bottle, said tube being provided with an opening for passage of gas and air in an upper side wall thereof, and said opening being positioned to be opened and closed by said stem upon sliding movement of said tube within the stem.

EDWARD W. HEETER.
ROBERT C. WOODHEAD.